R. S. BURDETTE.
CONVERTIBLE ROLL FILM CAMERA.
APPLICATION FILED SEPT. 12, 1916.
1,250,792.
Patented Dec. 18, 1917.
2 SHEETS—SHEET 1.
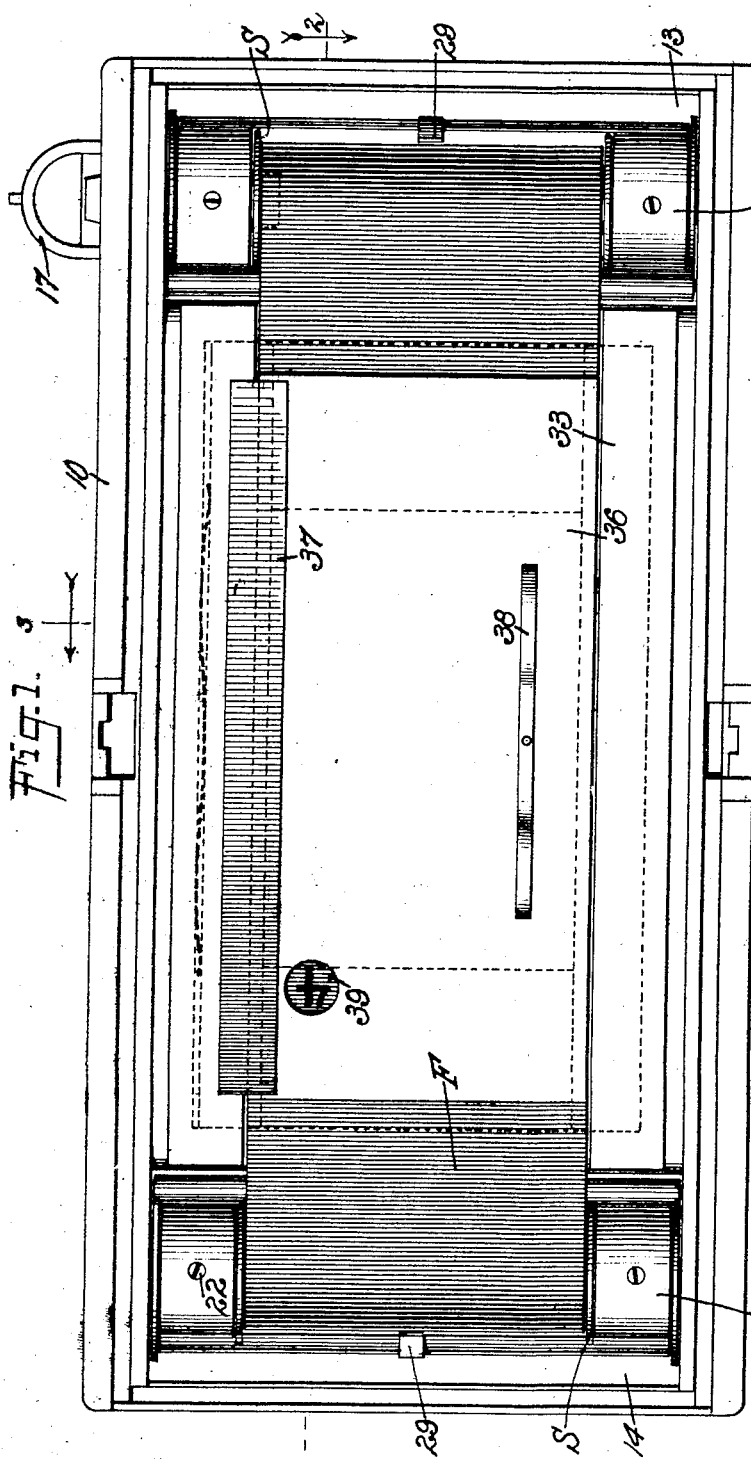
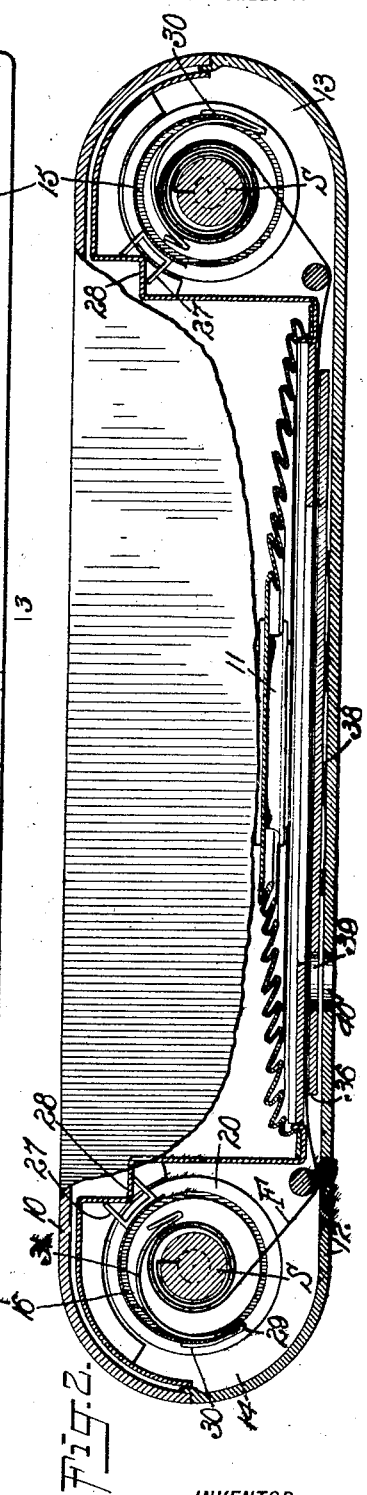
WITNESSES
William P. Goebel
Geo. P. Bulen
INVENTOR
R. S. Burdette
BY Munn & Co
ATTORNEYS R. S. BURDETTE.
CONVERTIBLE ROLL FILM CAMERA.
APPLICATION FILED SEPT. 12, 1916.
1,250,792.
Patented Dec. 18, 1917.
2 SHEETS—SHEET 2.
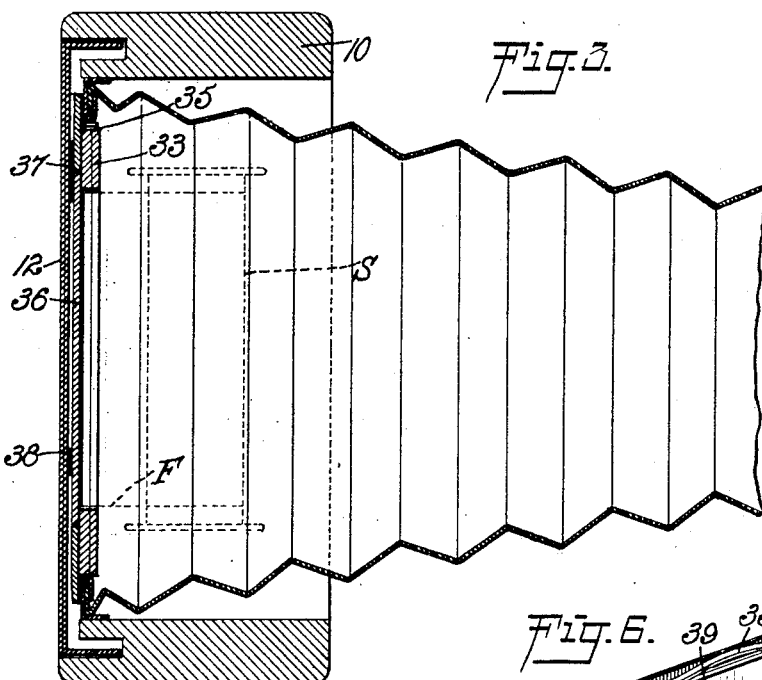
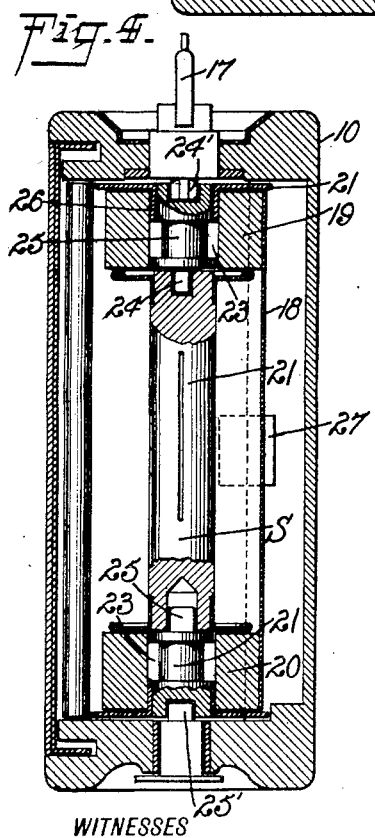
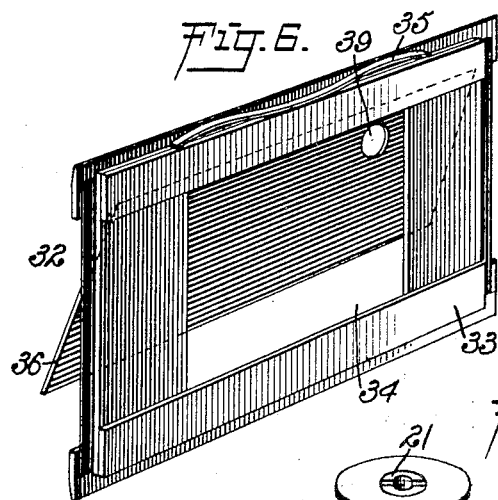
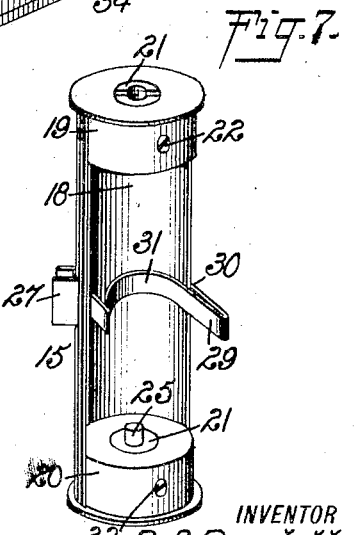
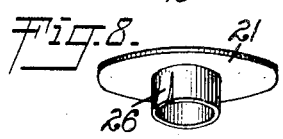
WITNESSES
INVENTOR
R. S. Burdette
BY
ATTORNEYS

UNITED STATES PATENT OFFICE.

RICHARD STUART BURDETTE, OF SAN FRANCISCO, CALIFORNIA.

CONVERTIBLE ROLL-FILM CAMERA.

1,250,792.    Specification of Letters Patent.    Patented Dec. 18, 1917.

Application filed September 12, 1916. Serial No. 119,671.

*To all whom it may concern:*

Be it known that I, RICHARD S. BURDETTE, a citizen of the United States, and a resident of San Francisco, in the county of San Francisco and State of California, have invented a new and Improved Convertible Roll-Film Camera, of which the following is a full, clear, and exact description.

This invention relates to photography and has particular reference to roll film cameras.

Among the objects of the invention is to provide a simple and reliable means for adapting a standard roll film camera or kodak of any known make or design for use with roll films made for smaller cameras without in any way marring the camera or interfering with its intended operation with the full sized film for which it was intended.

More definitely stated, I provide for a roll film camera a pair of carriers resembling in size and outside form the spools for the full sized film, but said carriers being adapted to receive the spools for the smaller size of film.

Another object of the invention is to provide means for manipulating the carriers and to hold them from rotation while the smaller rolls are used therein.

A futher object of the invention is to provide a tension device to control the rotation of the smaller film rolls in the carriers.

A still further object is to provide a mask or shield to be introduced into the back of the camera and having an exposure opening corresponding to the size of the film to be substituted for the regular size film, said mask also serving to hold the smaller film in proper focal plane so as to require no special adjustment or focusing with respect to the position of the film.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a rear elevation of a camera embodying my improvements, the back being removed;

Fig. 2 is a horizontal section on the line 2—2 of Fig. 1;

Fig. 3 is a vertical section on the line 3—3 of Fig. 1;

Fig. 4 is a vertical sectional detail of the winding roll and its carrier;

Fig. 5 is a detail view indicating the construction of the spool gudgeons;

Fig. 6 is a perspective view of the mask or shield with the cover partially open showing the exposure opening of the mask;

Fig. 7 is a perspective view of one of the spool carriers; and

Fig. 8 is a detail perspective of the portion of the gudgeon shown in Fig. 5.

Referring now more particularly to the drawings, I show in the main figures a well known type of roll film camera including a frame 10, lens mechanism 11, and back 12. In this connection I wish it to be plainly understood that the improvements referred to more in detail hereinafter are not dependent upon any particular size, make or design of roll film camera.

From what has been stated above, it will be understood that the primary and broad purpose of this invention is to provide a means whereby the standard film rolls intended to be used in the roll chambers 13 and 14 may be dispensed with when desired and smaller rolls accommodated in said chambers. To this end, therefore, I provide a pair of spool carriers 15 and 16 having a length and general outside form corresponding to the standard spools or film rolls intended to be used in this particular frame. These spool carriers 15 and 16 are substantially alike in size, form and construction with the possible exception that the carrier 15 may be the only one adapted to be manipulated in winding through the usual finger piece 17. With this exception a specific description of one of the carriers will be understood as being applicable to both.

Each carrier comprises a semi-cylindrical member 18 having upper and lower heads 19 and 20. The space between the heads is constructed of a length corresponding to the length of the small film roll to be substituted for the standard film roll and the capacity of the barrel is ample for the reception and accommodation of such smaller roll. The substitute spools are indicated at S which will be understood as being of standard construction and adapted to be pivoted in place in the usual manner, with the exception that in this instance the spools are pivoted within the spool carriers instead of directly in the chambers 13 and 14. In each of the heads 19 and 20 is fitted a gudgeon 21 adjustable lengthwise of the carrier, but limited in its movement by means of a lock screw 22 or its equivalent extending into a wide groove 23. The inner end of each of the gudgeons consists of or includes a projection, either a tongue 24 or a pintle 25, these features being similar to corresponding features 24' and 25' as ordinarily used. To introduce the spool S into one of the carriers, the gudgeons are moved endwise so as to admit the spool directly into the space between the heads 19 and 20 and then the gudgeons are moved toward each other so as to lock the spool in place. The spool carrier will then be introduced into the chamber in the camera frame in the usual manner. Any suitable form of catch or friction device, such as indicated at 26, may be employed to hold the gudgeons extended temporarily while the spool is being introduced.

When the carrier is slipped into its place, and the usual pivoting means for the spool are applied to the gudgeons 21, the carrier will be held from rotation by any suitable means such, for example, as a lug 27 formed on the barrel 18 and adapted to coöperate with any suitable corner or projection of the camera, as indicated at 28. It will be understood, however, that the gudgeons will be free to rotate with the spool in a manner precisely identical with the rotation of the usual film spool.

At 29 I show a combined finger piece and tension device. This device is shown in the nature of a leaf spring and secured rigidly at one end at 30 to one edge of the barrel and projecting outwardly therefrom, as shown best in Fig. 7, forming a narrow V-shaped finger piece for manipulating the carrier into or out of its place. The free end portion of the device 29 extends into the barrel in the form of an arc of a circle at 31 and serves to bear frictionally against the roll of film to control the movement of the spool or the unwinding of the film therefrom. Said free end of the spring 31 tends to occupy a position close to or adjacent the axis of the spool, but when the spool is inserted into the carrier the spring is more or less straightened.

The mask above referred to is represented as a whole at 32 and comprises a frame 33 having an exposure opening 34 of a size corresponding to the small film to be used. In this connection I wish to emphasize that a plurality or series of these substitute masks may be provided having different sizes or forms of exposure openings so that irrespective of the smaller film to be accommodated in corresponding sizes of spool carriers, the parts may always be properly correlated. The frame 33 may be held in place in the back of the camera frame by means of a spring 35 or its equivalent, so that when the back 12 of the camera is not in place the mask will not fall out of position. The mask also includes a rear cover 36 shown as a flat panel hinged at 37 along its upper edge to the upper portion of the frame and adapted to lie flatly against the back of the frame so as to hold the film F flatly in place between the cover and the frame at the exposure opening. This action of the cover 36 is made more secure or reliable by virtue of a light leaf spring 38 against which the camera back 12 operates. By this means the film will be held securely in the proper focal plane. This cover is provided with a peep hole 39 for the usual purpose and likewise the back 12 may be provided with one or more additional peep holes 40 to register with the holes 39 of the various sizes of interchangeable masks.

I claim:

1. The herein described spool carrier for film cameras, the same comprising a pair of heads, means to hold the heads in spaced relation to accommodate therebetween a smaller film roll, pivot means for said roll acting through the heads in axial alinement with each other, means carried by the carrier intermediate of its ends to bear directly upon the film to control the rotation or unwinding of the film arranged between said heads, and means to prevent the rotation of the carrier.

2. The herein described spool carrier for film cameras, the same comprising a pair of heads, means to hold the heads in definite spaced relation in axial alinement with each other to accommodate a small film roll between them, a pair of gudgeons journaled co-axially of each other in said heads, said gudgeons being movable endwise for manipulating the roll spool, and means to control the endwise movement of said gudgeons.

RICHARD STUART BURDETTE.

Witnesses:
EDW. THOMSON,
R. S. HOOVER.